United States Patent Office 3,493,937
Patented Feb. 3, 1970

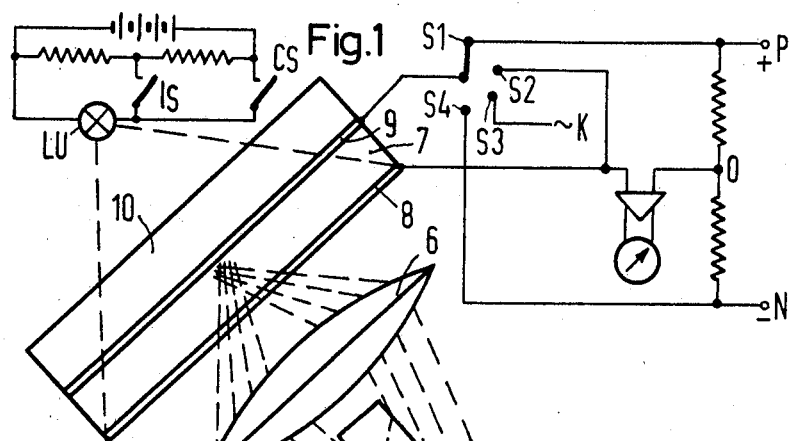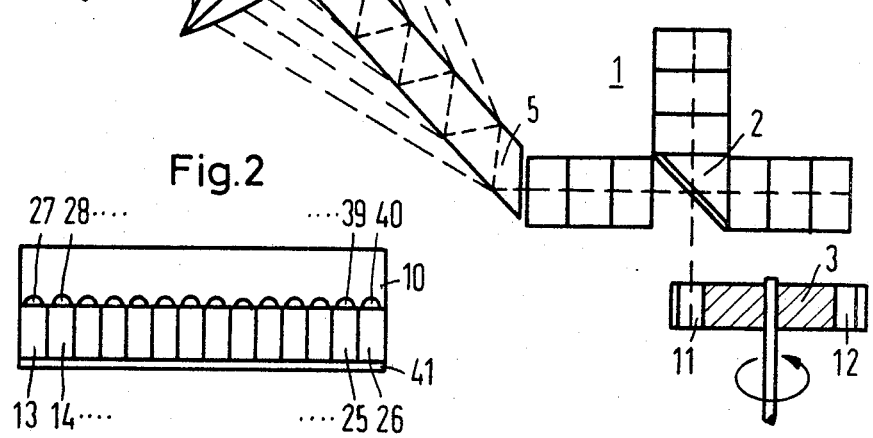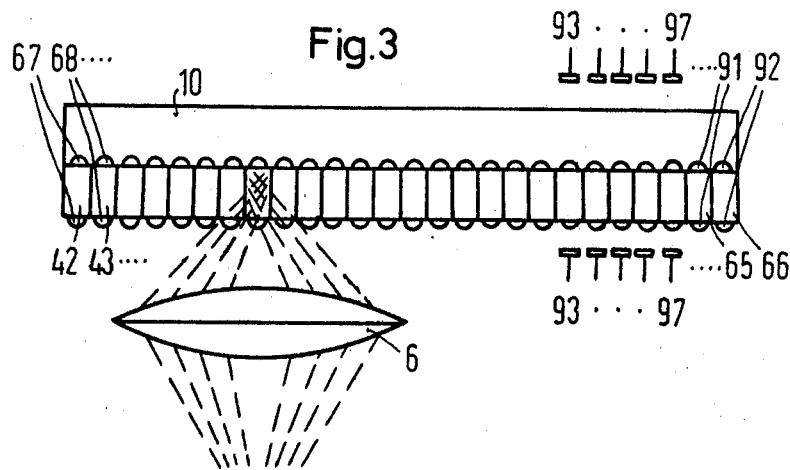

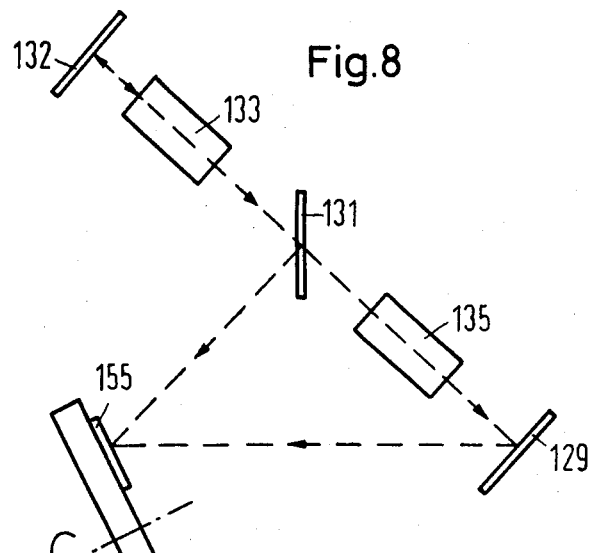
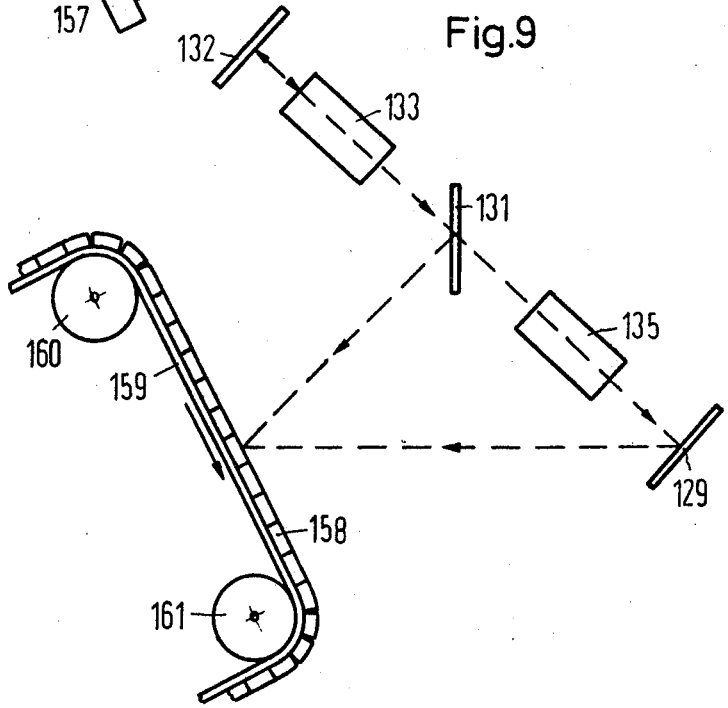

3,493,937
LASER ACTIVE AND OPTICALLY COUPLED APPARATUS FOR XEROGRAPHIC CONVERSION OF INFORMATION
Eberhard Groschwitz, Munich, Germany, assignor to Siemens Aktiengesellschaft, Berlin, Germany, a corporation of Germany
Filed Nov. 10, 1965, Ser. No. 507,196
Claims priority, application Germany, Nov. 10, 1964,
S 94,108
Int. Cl. G11b 9/02, 9/00; G02b 27/30
U.S. Cl. 340—173
27 Claims

ABSTRACT OF THE DISCLOSURE

Appartus for xerographic conversion of information available as a multi-component coherent electromagnetic radiation field generally in the optical spectral regions comprises an optical system for issuing such a radiation field. The optical system comprises anisotropic crystalline component regions, including double-refractory and laser-active regions. At least one retentive crystal structure forms part of the system so as to be responsive to this electromagnetic radiation. The retentive crystal structure is formed of material from the group consisting of ferroelectrics and photoelectrets and is optically in feedback connection with the laser-active components.

My invention relates to apparatus for xerographic conversion of information available as a multi-components coherent electromagnetic laser radiation field of high intensity.

It has been proposed to produce or amplify such a complex radiation field in an optical system consisting substantially of a system of crystals which comprises several anisotropic crystal regions or components of which one or more are double-refracting and laser-active and are optically coupled by the multi-component or complex coherent field of radiation.

According to my invention, I utilize for the xerographic conversion of such a radiative information complex the properties of crystalline materials, which, in response to electromagnetic radiation, exhibit the character of retention or remanence, such retentive crystals being constituted by ferroelectric and photoelectret materials. Suitable ferroelectric materials for purposes of the invention are, for example, Rochelle salt, lithium niobium-trioxide ($LiNbO_3$) and potassium niobium-trioxide ($KNbO_3$). Suitable photoelectrets, for example, may comprise sulphur (S), cadmium sulfide (CdS) and zinc sulfide (ZnS).

Under the influence of laser radiation in the simultaneous presence of an electrical field, there is deveoped in the interior of the photoelectret a space discharge distribution having a dipole character which is preserved when the light or other electromagnetic radiation and the electrical field are gone. Such an electret, therefore, is an electrical analogy to a magnet which once magnetized contains its polarized magnetism. By in-radiation of light or radiation of different type such as, for example, sonic radiation, the remanent space discharge distribution may be eliminated. In such case, the electrical charges are equalized by the occurrence of photocurrents. Photoelectric materials, when subjected to an electric field, exhibit polarization characterized by hysteresis.

According to the present invention, therefore, apparatus for the xerographic conversion of information available as a multi-component or complex coherent electromagnetic radiation field, generally in the optical or ultraviolet, visible and infrared regions more specifically comprises an optical system for producing and/or amplifying the radiation to be issued from the system. The system comprises anisotropic crystalline component regions including double-refractory and laser-active regions. The system is further provided with one or more retentive crystal structures responsive to the issued electromagnetic radiation and formed of ferroelectric and/or photoelectric material. The retentive crystal structure is feedback-coupled with the laser-active components, the feedback being optical and/or photoelectric.

Due to the photoelectric mutual effect of the multicomponent coherent field of laser radiation, the structure of the complex radiation field is exhibited by the polarization of the photoelectret component with respect to the quantitative magnitude of the dipole moment as well as with respect to the spatial distribution of the space-charge. The length of time during which the photoelectret is exposed to the complex radiation field also constitutes a parameter of the structure formation exhibited by the polarization distribution which the electret exhibits when the effect of the laser radiation is terminated and the excitation voltage applied to the photoelectret is removed. Since, in general, the polarization distribution then attained remains invariably fixed in the crystal for prolonged periods of time, the space charge distribution thus enforced in the photoelectret is utilizable as an electrical image of the structure for information exhibited by the laser radiation field.

For this reason, the polarization structure attained in the electret crystal constitutes a memory of the total information previously contained in the laser radiation field. Due to the high intensity of laser radiation, the short interval of time corresponding to one or several laser radiation pulses suffices to produce discernible polarization effects in the photoelectret, so that it is not necessary to control the photoelectret up to the saturation range.

The build-up of the polarization in the photoelectret under the influence of the laser radiation field occurs with a simultaneous application of an external electrical voltage to the photoelectret. This voltage, which may be switched on and off, is supplied to the electret, according to another feature of the invention, through electrodes which are permeable to the particular radiation involved. The electrodes are simultaneously applicable as boundaries or border layers of the laser-active crystal component regions. This assures that the coherent multi-component radiation field, or individual components thereof, will pass through the electret region of the crystal system, and is important because the polarization effect is not a surface phenomenon, but a volume effect.

It is preferable, therefore, to arrange the photoelectret region of the crystal system in a spatial region in which respectively different optical paths of the multi-component coherent radiation field are substantially or fully joined with one another.

According to a further feature of the invention, the information content of the multi-component coherent laser radiation is brought to interference within the photoelectret, in which case the interference structure which becomes embodied in the corresponding polarization structure of the electret represents the optical information content. The optical information content is therefore stored in the photoelectret and can thereafter be transferred as desired by other optical and/or electrical systems. The information content thus stored in the photoelectret memory permits the storage and transfer of a very large number of individual information data. The interference configuration thus precipitated in the photoelectret is to some extent comparable with a system of punch cards serving as an information memory.

The multi-component laser radiation field may be branched with respect to its optical paths, and portions of the optical path lengths may be varied as suitable control effects with respect to time and space. The control effects then become discernible in a merger range of the various optical paths within the interference structure. The interference structure, in general, constitutes an information content which was impressed upon the branched radiation field. If the photoelectret, as hereinbefore mentioned, is arranged in the spatial region of the interference structure, the resulting polarization structure within the photoelectret constitutes a corresponding image of the optical total information content.

The photoelectret may be designed as a thin layer or film having a thickness of less than 100 microns. According to another feature of the invention, therefore, it is preferable to provide or deposit the electret film on a supporting substrate which is permeable to the frequencies utilized and which also supports the electrodes of the photoelectret. The substrate may comprise, for example, quartz or glass.

According to an other feature of the invention the electret is subdivided, with respect to elimination and corresponding information content, into a raster-shaped pattern. This may be achieved by placing a raster-shaped foil or mask upon the electret. Another way is to provide an electret comprising a system of mutually independent electret cells in a raster-shaped arrangement. This permits analyzing or resolving the structure of the information content to be stored in the electret into a system of many individual cells, data units or bits, so that even a microstructure of the information content may be utilized to some extent for communication purposes. Each of the mutually independent cells is connected to its own circuit and the radiation permeable cell electrodes are insulated or independent of each other. In the case of a raster-shaped pattern using a masking raster film, the electret remains homogeneous and is subjected to some kind of cellular structure only by the raster placed upon the surface.

According to a further feature of the invention, I provide, aside from the spatial resolution, a time resolution of the laser field structure. For this purpose, I make the electret movable. One way of achieving this is to mount the electret on a movable strip which is displaced during operation, so that each time a given partial area is affected by the coherent radiation field, thus being individually subjected to a variable xerographic action. The electret, regardless of whether it comprises a unitary structure or an array of electret cells, may be mounted on a rotatable disc or a rotatable drum in order to be movable or displaceable, as described.

For readout of the total information stored in the electret in the form of a space charge distribution with an electrical dipole moment, I provide suitable sensing means responsive to the polarized space charge, such means comprising, for example, a probe electrode at a given reference potential, the electret electrodes themselves. The readout may also be accomplished by an electron beam which is deflected in the dipole field of the electret.

The permeable electrodes of the electret may be connected in an electric circuit which preferably includes a registering device for measuring the charging current resulting during the readout operation. I further provide a separate radiation source which furnishes radiation traversing the electret for reading of the stored information content and releasing the discharging currents to be measured or registered as an indication of the stored or memorized information.

With respect to the external circuitry of the electret, regardless of whether it is a single structure, a cell of an electret system, or the entire electret system, three phases are to be distinguished. During the phase of irradiation by the laser field, an external voltage (O–P in FIG. 1) is impressed between the electrodes of the electret. Under the effect of the impressed voltage, a photocurrent will flow during illumination in accordance with the space charge distribution being formed. During the phase of information storage, the external voltage is switched off upon each termination of the laser-field action, but the circuit of the electrodes is kept closed. During the clearing phase, however, the electret is irradiated by an information-cancelling radiation field at which time the external circuit is open.

For the electrophotographic deposition of the information content, and in accordance with a further feature of the invention, the electret, after receiving the information content and retaining it in the form of a corresponding pattern of space charge distribution, is covered with a powder composed of negative and positive particles. An electrophotographic paper is then placed upon the powder. The paper is provided with an electrode for applying a high intensity electric field, preferably of several kilovolts per cm. The electrophotographic paper may be of tape form, and upon exposure may be wound upon a roll to be stored for subsequent utilization of the electrophotographic image.

For providing an optical feedback coupling, and in accordance with a more specific feature of my invention, the region of the crystal system constituted by the photoelectret is designed as a boundary layer for further laser-active crystal components of the over-all system. In this manner, an optically variable boundary of laser-active crystal component regions is obtained, and the optical properties of the boundary-forming electrodes are first modified by the laser radiation field on the one hand. The resulting modification in optical properties of the electret, however, causes a change in the boundary conditions and functions as a feedback upon the effect of the laser activity in a laser-active crystal region. The laser effect is thus controlled with respect to its threshold value as well as relative to the intensity. The control is effected by variable boundary conditions resulting from the laser-radiation itself in the sense of a feedback and in given time intervals of the working program of the individual laser-active component crystals.

In this case, the electret is joined or integral with a semi-transparent, partially reflecting, layer and forms together with such layer an optical unit constituting an optical boundary condition of the laser-active crystal component region. According to this particular feature of the invention, therefore, the conventional boundary of a laser-active resonant crystal component region, for example, a Perot-Fabry assembly, is supplemented by a photoelectret. This provides a controllable optical boundary condition for the resonator, which condition is variable by the effect of the laser beam itself as well as by external addition effects of optical or electrical type.

In accordance with the invention, a different kind of feedback coupling to the laser activity of resonant crystal component regions is the effect of the photocurrent provided by the photoelectret, at least at predetermined intervals of time, upon the electrical circuit components of the laser-active crystal component regions. This may be accomplished by conventional means such as, for example, capacitive or inductive components. In this manner, an optical feedback coupling is provided through the electrical circuit paths of the over-all system.

According to another, alternative, feature of the invention, the information content is stored, at least in part, by a component crystal region which is designed as a ferroelectric structure. This utilizes the physical property of ferroelectricity in which, analogously to an electromagnet, electrical dipole moments are formed in the material and exhibit a hysteresis behavior, the dipole moments being reversible in polarity in an external electrical field. According to the invention, the dipole moments are utilized as components of the information content furnished by the laser-radiation field, and the photoelectret is utilized as an optical intermediate between the laser field and the polarization effect in the ferroelectric material.

According to a more specific feature of the invention, radiation field is effective, in order to produce the desired latent electrophotographic image.

The duration of the first circuit condition required for the formation of the space charge structure may be considerably shorter than is necessary for obtaining saturation polarization. This is because the process of polarization commences immediately as soon as the electret 7 is simultaneously subjected to the electrical field and the optical radiation field, and also because very short exposure intervals are sufficient due to the high intensity of the interfering laser radiation field.

Upon termination of the first interval of time required for impressing the information content into the photoelectret 7, the next period of time commences, during which the information content may be maintained in storage in the electret for any desired length of time. This requires a new circuit condition of the photoelectret 7 during which the radiation of the laser radiation field has ceased and no external electrical potential is applied to the electrodes 8 and 9. In this second circuit condition, the external circuit is short-circuited between the electrodes 8 and 9. This is accomplished by movement of the switch S to its position S2. As a result, the stored electrophotographic image remains preserved in the photoelectret 7. Physically, this is due to the fact that when the electrodes 8 and 9 are short-circuited, the internal electric field in the photoelectret 7 becomes extremely slight, whereby the polarizing space discharge distribution in the interior of said photoelectret is largely neutralized by charge carriers at the outer electrodes. The charge carriers are due to the influence of the short-circuited electrodes. In this condition the information content is stored by spatially fixed space charge distribution.

The third circuit condition is required for transferring the stored information content from the photoelectret 7 to other, external, receivers (not shown in the figures). The transfer may be effected in different ways. In the first place, an electrical transfer may be provided. For this purpose, the photoelectret 7 with its electrodes 8, 9 is electrically connected or placed into the inner field of a capacitor system comprising a plurality of probes in a raster-type arrangement. In FIG. 1, a raster array of capacitive probes is schematically shown at K. In reality, the raster array may correspond to the raster electrodes illustrated in FIG. 3 and more fully described hereinafter. The electrical transfer of the latent image from the electrode to the system of capacitive probes connected to respective voltages, is effected by suddenly opening the short-circuited connection between the electrodes 8 and 9. This is achieved by the movement of the switch S from the position S2 to the position S3. A pulse then occurs between each pair of probes in the readout capacitor system K. The charging quantity in each probe circuit depends upon the particular polarization that was fixed in the photoelectret 7 at the particular locality of the probe. It is to be noted that, with respect to this transfer process, the structure of the electrophotographic image is the determining prerequisite, but that the time required for the electrical transfer to the raster-type system is extremely short. The time required for the electrical transfer is thus shorter by orders of magnitude than the time which would be required for relaxation up to complete equalization of the charge within the photoelectret 7.

This physical phenomena is important with respect to the aforedescribed readout performance. For this reason, the readout means constituted by the aforementioned raster system of probes is an essential feature of the present invention. This is because the transfer of the latent information image onto the raster system occurs virtually at the moment that the short-circuited connection of the electrodes 8 and 9 is opened, and the influenced charges at the surface of the electrodes become released, these charges having been retained at the surface during the circuit condition of information storage in accordance with the magnitude of the polarization in the volume of the photoelectret 7. The plurality or array of respective charges transferred to the raster-type system of probes may be electronically transmitted in conventional manner to other electrical systems, where it may be further utilized as an electrical image of the information content.

The fourth circuit condition of the photoelectret 7 is the clearing of the information-denoting polarization structure in said photoelectret. In this condition, as a rule, the external circuit of the electrodes 8, 9 is to be kept open. The readout system of raster-type probes is removed from the photoelectret or the photoelectret is removed from the system of probes. When the electrode circuit is opened, the photoelectret 7 may be subjected to electromagnetic radiation or to sonic radiation. The electromagnetic radiation utilized to clear the stored information may also be laser radiation supplied either from external radiation sources or branched off from laser-active crystal regions of the overall crystal system. In FIG. 1, a separate source of radiation LU such as, for example, laser radiation, may be energized by a clearing switch CS to irradiate the photoelectret 7 through the transparent or radiation-permeable substrate 10.

In order to clear the stored information, in the fourth circuit condition, by sonic radiation, the photoelectret 7 may be connected to a source of ultrasonic radiation. The source of ultrasonic radiation may be an oscillating quartz crystal electrically excited to produce oscillations which are transmitted to the photoelectret 7 as ultrasonic waves. In special cases, the clearing of the information stored in the photoelectret 7 may be effected, according to another feature of the invention, by applying to said photoelectret for given intervals of time, an external voltage which produces an electrical field having a direction which is opposed to the field effective during impression of the information. In FIG. 1, such electrical means for clearing the stored information are shown. That is, in lieu of using the separate radiation source LU, or together with the use of said radiation source, the switch S may be moved to its position S4, in which it temporarily applies to the electrodes 8 and 9 a voltage opposed to the voltage applied to said electrodes in the first circuit condition. The laser radiation from the source LU and ultrasonic radiation may be utilized simultaneously to clear the stored information from the photoelectret 7.

In accordance with other features of the present invention, it is often preferable to provide a more complex photoelectret. The photoelectret may comprise, for example, a number of layers of photoelectret material such as, for example, sulfur, cadmium and zinc sulfides and anthracene, separated by intermediate layers of ferroelectric material such as, for example, Rochelle salt, $KH_2PO_4$, $(NH_4)_2SO_4$, guanidine aluminum sulfate hexahydrate, glycine sulfate, colemanite, thiourea, $BaTiO_3$, $Cd_2Nb_2O_7$, $PbNb_2O_6$, methyl ammonium alum and $(NH_4)_2Cd_2(SO_4)_3$. Preferably, however, the photoelectret is provided with a raster-shaped cellular structure so that the impressed information content is distributed over numerous, equivalent cells of said electret. These cells may be formed simply by subdivisions of the same crystal. However, in a preferred embodiment, the individual cells, although arranged in proximity to each other and forming a single raster array, operate independently of each other electrically. This necessitates the provision of each individual raster cell of the photoelectret with its own electrical circuit connection which must satisfy the aforementioned switching conditions. Consequently, at least one electrode of each cell is independent of the other cells and their electrodes and is electrically separated or isolated from such other cells and their electrodes, whereas the other electrode of each cell may be common to the electrodes of the other cells. In the latter case, all of the individual cells are connected to a common reference potential. This is technologically significant, because it facilthe ferroelectric material may have a cellular structure so that each individual cell of the photoelectret is coupled, circuit-wise, with one of the respective cells of the ferroelectric material. The ferroelectric crystal component region in this case is arranged in the action range of an electrical field which is switched on and off by the photoelectret and which has a polarity which may be reversed.

In order that the present invention may be readily carried into effect, it will now be described with reference to the accompanying drawings, wherein:

FIG. 1 is a schematic diagram of an embodiment of the xerographic conversion apparatus of the present invention conjointly with a representation of appertaining electric circuits;

FIG. 2 is a schematic diagram of an embodiment of a cellular photoelectret which may be utilized in the apparatus of FIG. 1;

FIG. 3 is a schematic diagram of another embodiment of a cellular photoelectret together with optical information entering means and electrical readout means which may be utilized in the apparatus of FIG. 1;

FIGS. 8 to 11 show diagrammatically four other embodiments;

Figure 4:
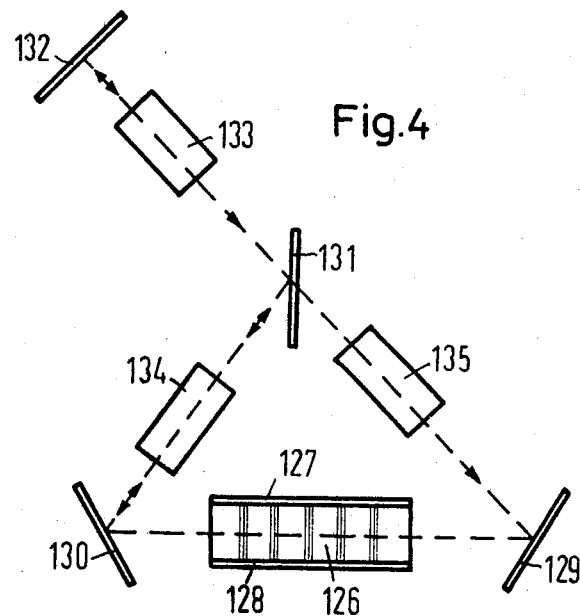
FIG. 4 is a schematic diagram of another embodiment of the xerographic conversion apparatus of the present invention indicated primarily by its beam path.

Apparatus for the internal modulation of laser radiation, including materials utilized for the various components, is disclosed and described in copending patent application Ser. No. 358,303, filed Apr. 8, 1964, now Patent No. 3,418,476 and assigned to the assignee of the present application. A solid state system for stimulated emission of electromagnetic radiation, including materials utilized for the various components, is disclosed and described in copending patent application Ser. No. 393,012, filed Aug. 27, 1964 now Patent No. 3,398,294 and assigned to the assignee of the present application.

The apparatus of FIG. 1 comprises a crystal system 1 comprising a plurality of laser-active component crystal regions capable of resonance. A multi-component or complex coherent radiation field is stimulated and selectively amplified in the crystal system 1. In the individual laser-active components of the crystal system, the laser radiation is mutually and simultaneously induced so that ultimately there results a stimulated emission common to all of the laser-active component regions. The radiation field is schematically represented only by the axis of the beam path, such axis being shown by broken lines.

In the present example, only three individual crystal component regions are shown, each having a cellular structure of the resonator. A prism-type medium 2 combines the individual component radiation paths in the crystal system 1 to a simultaneously coupled total radiation field of mutual stimulation. A laser device 3 provides the data input of the apparatus. The laser device 3 functions as an information transmitter which selectively radiates different signals into the composite crystal system 1. In principle, the laser device 3 comprises a plurality of laser-active parts 11 and 12 which may be varied in position or exchanged for one another by rotation of the disc upon which they are mounted. In this manner, at least one of the lasers 11 and 12 may be coupled into the already present total radiation field of the crystal system 1. Instead of being mounted on a rotatable disc, the laser-active parts may also be mounted on another type of suitable movable mechanism.

The multi-component coherent radiation field, in which, as mentioned, one or more components may be selectively amplified, is radiated into an interferometer assembly 5 Suitable for utilization as the interferometer 5 of the apparatus of FIG. 1, is an optical member or plate in which the radiation, as indicated, is subjected to multiple reflection, so that optical bunches of parallel rays issue along different optical path lengths. The bunches of rays are brought into interference with each other by a collecting lens 6. The resulting interference figure has a structure which corresponds to the information content of the simultaneously coupled radiation field. Each frequency in the interferometer assembly 5 can issue at a given angle, so that two different frequencies also correspond to two different interference arrangements.

In accordance with the present invention, the spatial region in which the interference figures or structures are provided is filled by a photoelectret 7. This permits the fixing of the information content of the coupled laser field in the crystal body of the photoelectret 7. The information totally manifests itself, therefore, in the photoelectret 7 as a latent electrophotographic image. The electrophotographic image is constituted in the photoelectret 7 by a given space charge structure which, by freely selectable external conditions, may be kept in storage for any desired length of time and which may be read out by corresponding electrical or optical means. The electrophotographic image may be ultimately cleared from the electret by other suitable means, if desired.

The photoelectret 7, in its simplest form, is provided with electrodes 8 and 9 which are permeable to the frequencies being employed. The electrodes 8 and 9 permit the placing of the electret 7 under the effect of a strong electrical field which effects the formation of a space charge distribution when the laser field, brought to interference, is radiated into the electret. A region of strong electrical polarization occurs at the localities which become optically brighter, whereas no electrophotographic polarization occurs at the spatial localities where the interference causes darkening.

Since the photoelectret 7 may comprise a thin layer or film, said photoelectret, with its radiation-permeable electrodes 8 and 9, is positioned, supported or deposited upon a substrate 10 which functions particularly as a reinforcement and support to permit proper adjustment. A radiation-permeable medium such as, for example, glass or quartz, is preferably utilized as the material of the substrate 10. The information content of the photoelectret 7 is eliminated by suitable additional radiation from the outside. Transparency of the substrate is also required for the production of xerographic reproductions from the latent image stored in the electret 7.

In conjunction with the fixing of the information entered into the photoelectret 7 by the laser radiation field and contained in said photoelectret as a latent electrophotographic image, four different electrical circuit conditions of said photoelectret are provided.

In a first circuit condition, the electrophotographic image in the photoelectret 7 is produced in the aforedescribed manner. For this purpose, the photoelectret 7 is subjected to the interference figure of the laser radiation field as well as to an additional electrical field between the electrodes 8 and 9. It is, therefore, necessary to connect the two radiation-permeable electrodes 8 and 9 to an external voltage source, indicated in FIG. 1 only by its poles or buses P and N. During the entering of the information into the electret, the switch S is in the illustrated position S1, so that the voltage P–O, taken from the voltage divider between the buses P and N, is effective between the electrodes 8 and 9. During this circuit condition, the laser radiation field acts upon the photoelectret 7 either continuously or during given short intervals of time. In principle, however, the electrical field between the electrodes 8 and 9 must be switched on while the interference figure of the laser itates the further transfer of the information content from the individual cells to other electronic systems. In special cases, however, each pair of electrodes of the cells may be connected electrically independently of the other cells of the same array.

To elucidate the explanation of the storing of information by means of photoelectret cells, an analogy may be made to storage by a system of punch cards. In accordance with the present invention, the total information supplied by the laser radiation field and selectively amplified therein, is transferred to a system of photoelectrets whose raster array of cells corresponds to an optical system of punch cards. The information content and its shades of meaning in the photoelectrets are, of course, vastly superior to those of punch cards. In accordance with the invention, an individual cell not only permits the storage of a yes-no statement, but the quantitative degree of polarization may assume any desired value within given ranges, so that the intensity of polarization or the stored charge quantity represents a quantity of information within the cell. This type of information content is therefore more closely comparable with a scale of color values or with acoustical sound.

The raster-type photoelectret assembly, too, may be modified by composing it of layers as described with reference to FIG. 1. In such composite structures, the layers are preferably separated from each other or mechanically supported or braced by radiation-permeable substances such as, for example, glass, quartz, or ferroelectric materials.

In the aforedescribed conversion apparatus, the photoelectrets may be mounted on movable or displaceable supports, members or mechanisms such as, for example, tapes. The tapes may be long, endless tapes or tapes wound from one spool onto another. The electrets may also be mounted on drums or on rotatable or movable spheres. This permits alternately or sequentially applying different photoelectret systems in a programmed time sequence adapted to the emission times of the laser radiation field. Thus, for example, in determined switching intervals, certain photoelectret cells, serving to supply or store information, may be positioned in registry with other photoelectret cells, whereas other photoelectret cells are simultaneously switched for clearance of information stored therein, or selected photoelectrets may be applied in other electrical or optical systems for further processing of their information content. Such a programmed operation is of interest for example for the electrophotographic and xerographic utilization of the latent information content by electrophotographic transfer to photoelectric paper.

FIG. 2 is an embodiment of a photoelectret comprising individual cells 13 to 26. A common electrode 41 is provided for all the cells on one side of said cells and individual separate electrodes 27 to 40 are provided for each of said cells on the opposite sides of said cells. The photoelectret is mounted on a supporting and transparent substrate 10' in the aforedescribed manner with reference to FIG. 1. The electrical leads attached to the individual electrodes 27 to 40 extend to points beyond the photoelectret in the planes between the electrophotographic cells and the transparent substrate 10 along raster lines so that said electric leads do not obscure the radiation field. Although the individual cell circuits are not shown in FIG. 2, each of them may be designed and switched in principle in the manner described with reference to FIG. 1 and the switching is preferably accomplished by solid-state circuit components.

FIG. 3 discloses a movable assembly of photoelectret cells 42 to 66 mounted in operative proximity with a collector lens 6'. Each of the cells is provided with its own pair of electrodes 67 to 92. The assembly of photoelectret cells is positioned between capacitive probes 93 to 97 which as hereinbefore explained, function to electrically read out the information content stored in said photoelectret cells.

In FIG. 4, the beam path of a mirror arrangement 129, 130, 131, 132 comprises a laser-active crystal system comprising a plurality of component crystals 134, 135, 126. The mirror 131 is semi-transparent. The crystal 126 is a photoelectret in which the branched coherent radiation from the crystal component region 133 produces an interference structure according to which a corresponding polarization is provided which is stored or memorized as as the information content of the multi-component laser-radiation field. The photoelectret 126 is provided with electrodes 127 and 128 for control of the information content in the aforedescribed manner.

The laser-active crystal component region 133 may comprise a plurality of laser-active resonant crystal component systems which are mutually active optically upon each other and produce a simultaneous multi-component laser-radiation field. Certain component systems of the crystal may also be designed as laser diodes. The individual crystal component systems are tuned with respect to their spectral range, so that in totality a larger spectral width is covered than would be the case with a single crystal component range. If several laser diodes are employed as crystal component regions, for example, the widths of the forbidden bands of the respective regions may be made to differ from each other by providing material of different composition in the respective regions or by applying external mechanical forces. Corresponding conditions are also applicable with other laser-active crystal component systems.

In FIG. 4, the individual crystal component regions of the system 133, as well as the semi-transparent reflectors which produce resonance in the component system 133, are not shown. The crystal component regions 134 and 135 may serve to fix determined optical path lengths which are to be modified in an intended manner by imposing external effects upon the crystals. For this purpose, the crystals may have, for example, piezoelectrical properties and they may also be anisotropic and double-refractory. The refraction index may be modified by an electrical control, thus storing additional low-frequency information by modulation of the optical path. Furthermore, at least one of the crystals 134 and 135 may itself be a laser-active system which produces, together with the crystal component region 133, a multi-component laser-radiation field of simultaneous oscillation.

According to another feature of the invention, the photoelectret in the embodiment of FIG. 4 is traversed by the radiation in parallel with the electrodes, as opposed to the embodiments of FIGS. 1 to 3 wherein the radiation path is perpendicular to the electrodes of the photoelectret. The interference structure produced in the photoelectret is indicated in FIG. 4 by a corresponding periodic occurrence of parallel, vertical interference lines. In regions brightened by radiation, a corresponding polarization occurs in considerable contrast to the substantially lower polarization in regions where a compensated or nullified radiation intensity occurs. The complex information content may thus be represented by a corresponding complex or complicated interference figure.

A system otherwise corresponding to FIG. 4, however, may be modified by positioning the photoelectret in such a direction relative to the laser beam path that the two electrodes 127, 128 are vertically or perpendicularly penetrated by the radiation. Regardless of such modification, the aforedescribed circuit conditions for entering, transferring and clearing the information content of the electret remain applicable. The photoelectret in systems of the type of FIG. 4 may be of the aforedescribed cellular configuration.

Figure 5:
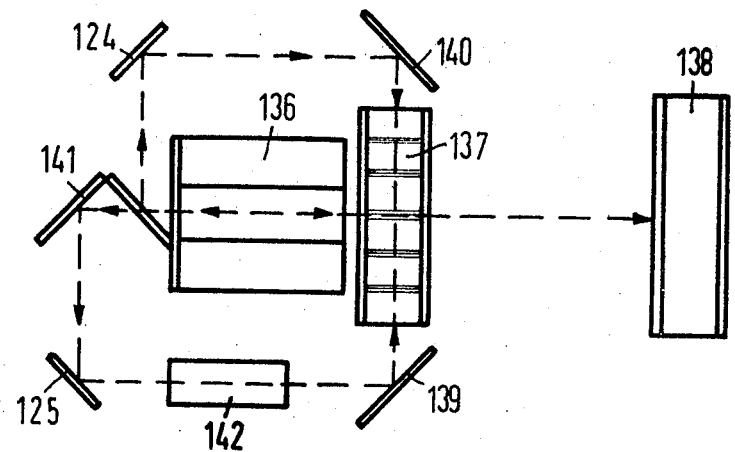
FIGS. 5 and 6 are schematic diagrams of two further embodiments of xerographic conversion apparatus.

In the embodiment of FIG. 5, the laser diode 136 emits a multi-component coherent radiation field onto a photoelectret 137 and is also subjected to repeated branching by means of mirrors 124, 125, 139, 140 and a prismatic mirror arrangement 141. In this manner, the branched radiation field represented by the broken-line radiation paths, is caused to produce interference within the photoelectret 137. As hereinbefore explained, this produces in the photoelectret a polarization structure which corresponds to the interference structure and represents the information content of the radiation field. As shown in FIG. 5, the laser beam emitted by the laser diode 136 passes directly through the polarization structure of the photoelectret 137, whereby the laser beam is modified due to the control effect in the crystal regions of respectively different polarization structure. The information content of the resulting interference field is further modified, predominantly by low frequency, by the generally crystalline medium 142 which is positioned in the laser beam path. The crystal medium 142 has the property of varying its refractive index due to the external effect of electrical or mechanical control means. A crystal suitable for utilization as the crystal 142 is indicated in the aforementioned copending patent application Ser. No. 393,012.

In a modified embodiment of FIG. 5, the crystal medium 142 may be double refracting, in which case particularly the polarization direction of the resulting branching of the ray path may be controlled. In a manner similar to that of the system of FIG. 5, the primary beam, as well as the side beams, may be made to interfere. In this case, however, the polarization properties of both beams contribute to the information content.

The beam spread apart by the interference structure in the photoelectret crystal 137, impinges upon a second photoelectret 138 in which the ultimate information is stored in the aforedescribed manner. The optical effect in the photoelectret crystal 137 corresponds on the one hand to an optical feedback coupling of the laser radiation field upon itself and, on the other hand, to a gate for the output emission of the laser radiation field to the photoelectret 138, such output gate being optically controlled in dependence upon the information content. The photoelectret 137, as well as the photoelectret 138, may be of the aforedescribed complex configuration comprising numerous photoelectret cells. Furthermore, both electrets 137 and 138 may be movably or displaceably mounted in the aforedescribed manner, so that new photoelectric crystal regions are utilized in chronological sequence. The aforedescribed switching and circuit conditions apply to both photoelectrets 137 and 138 or to arrays of photoelectret cells.

Figure 6:
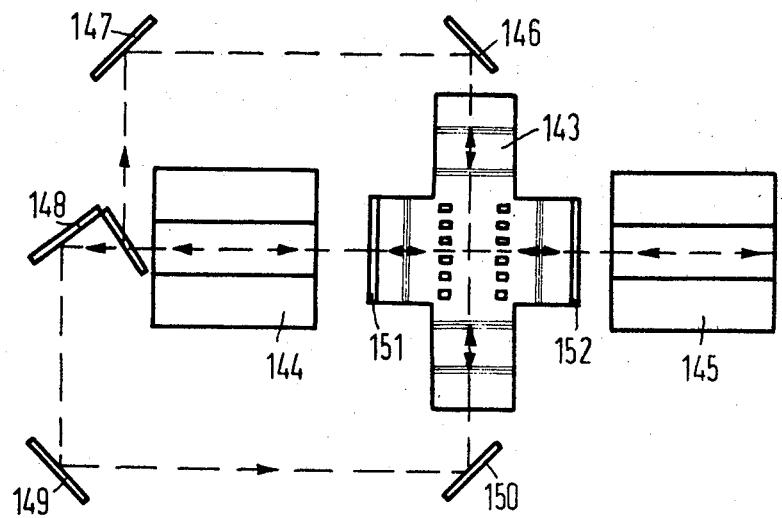

In the embodiment of FIG. 6, a multi-component radiation field of mutually stimulating laser diodes 144 and 145 is brought to interference in the photoelectret 143 through the mirror system of mirrors 146, 147, 148, 149 and 150. As shown, two main beam directions of the joint, coherent radiation field penetrate each other perpendicularly or vertically in the photoelectret 143. This produces a three-dimensional interference configuration representative of the information content in the spatial regions of the photoelectret 142 in which the two interference structures are superimposed upon each other. Further utilization or function of the information content is in accordance with the foregoing disclosure.

Figure 7:
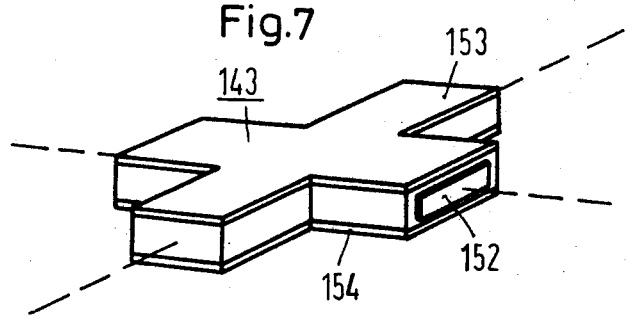
FIG. 7 is a perspective view of a photoelectret utilized in the apparatus of FIG. 6.

The photoelectret 143 is provided with two pairs of radiation-permeable electrodes 151 and 152, and 153 and 154 in order to provide the polarization structure in said photoelectret. The transparent or permeable electrodes 151 and 152 are shown in FIG. 6. The pair of electrodes 151 and 152 extend perpendicular to the plane of illustration of FIG. 6. The transparent or permeable electrodes 153 and 154 are shown in FIG. 7. The pair of electrodes 153 and 154 extend parallel to the plane of illustration of FIG. 6 and limit the thickness dimension of the photoelectret 143.

In the embodiment illustrated in FIG. 8, a system of electrets is mounted on a rotatable disc so that, during rotation, sequentially different areas on the disc are xerographically affected by the coherent radiation field. The apparatus is essentially similar to that of FIG. 4, except for a few simplifications. Thus, in the apparatus of FIG. 8, the crystal 134 for modifying the optical path length and the mirror 130 are omitted. The optical beam, branched by means of the semi-permeable mirror 131, reaches the electret system 155, 156, 157 directly from the mirror 131 and also through the crystal 135 and the mirror 129. A number of electret crystals 155 and 156 are arranged in a circular, coaxial group on the front face of a rotatable circular disc 157 and are provided with electrodes and electrical circuits as explained above with reference to FIG. 1, these electrical components being not repeated in FIG. 8.

In the embodiment shown in FIG. 9, a system of electrets is arranged on a movable strip or belt in such a manner that individual component areas of the strip are xerographically affected and varied by the coherent radiation field. The strip or belt 159, running over rollers 160 and 161, carries a cell-type system of electrets corresponding to that described above with reference to FIG. 3. The optical writing of information into the electret system is performed with the aid of an arrangement corresponding to that of FIG. 8.

Figure 10:
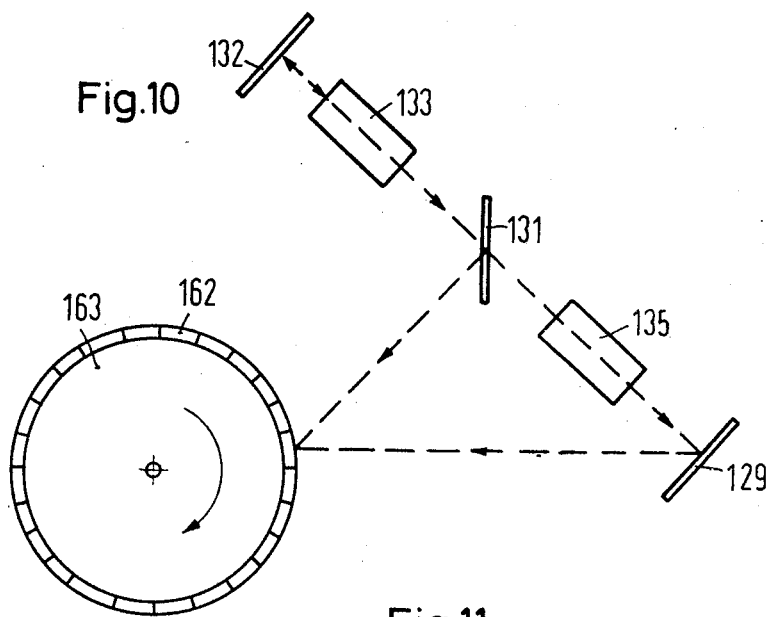

The embodiment shown in FIG. 10 is similar to that of FIG. 9 except that the system of electrets 162 is mounted along the periphery of a drum 163.

Figure 11:
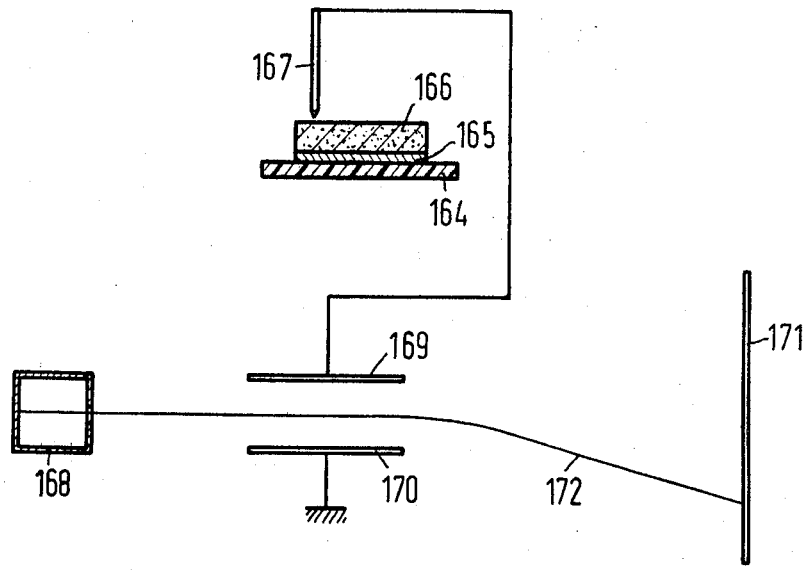

As mentioned, the information stored in the electret system may be read out by means of an electron beam deflected in the dipole field of the electret system. This is exemplified by the equipment schematically shown in FIG. 11. The electret 166, mounted on a conveyor belt 164 and provided with an electrode 165, travels perpendicularly to the plane of illustration beneath the point of a probe 167 which is electrically connected to a plate 169 of a deflector system whose opposite plate 170 is grounded. An electrode gun 168 issues an electron ray 172 which is deflected upon a fluorescent screen 171 by the dipole field of the electrode 166 sensed by the probe 167. The amount of deflection corresponds to the information stored in the electret 166.

Figure 12:
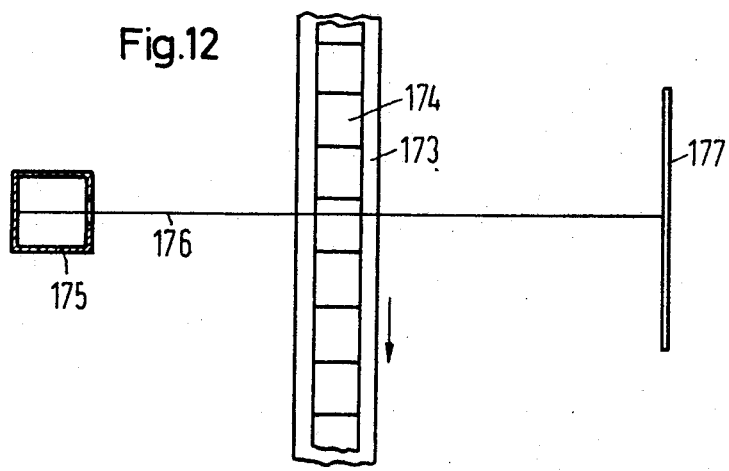
FIGS. 12 and 13 are a lateral elevation and a plan view of an electronic readout device.
Figure 13:
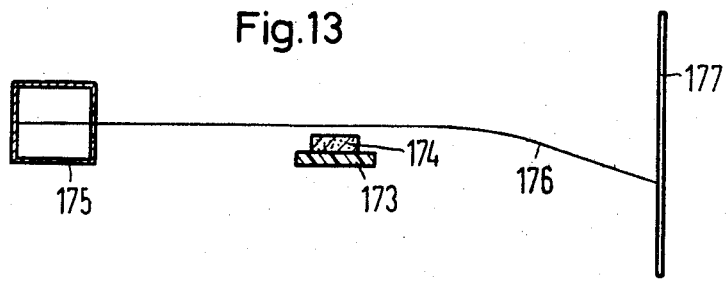

A different form of readout by means of an electron ray is represented in FIGS. 12 and 13. In this embodiment, the conveyor belt carrying the electret system 174 travels in the direction indicated by an arrow in FIG. 12. An electron gun 175 issues an electron ray 176 which passes by the electret system where it is deflected (FIG. 13) in the dipole field of the electret system, before the ray impinges upon a fluorescent screen 177. The deflection of the electron ray corresponds to the information stored in the electret system.

Figure 14:
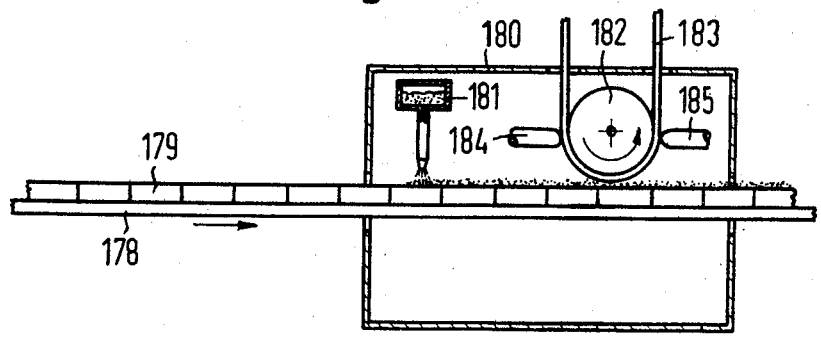
FIG. 14 shows schematically a xerographic printing apparatus according to the invention.

FIG. 14 illustrates schematically an embodiment of the invention in which the information stored in the electret system is developed in form of an image. The electret system 179 is mounted on a conveyor belt 178 and travels through a device 180 in which the electret system 179 is covered by a layer of particles issuing from a nozzle 181 as a spray of electrically charged powder. A pressure roller 182 passes an electrophotographic sheet of paper 183 over the electret covered with the charged powder, while contact brush electrodes 184 and 185 apply suitable electrical voltages between the electret and the electrophotographic paper.

A further embodiment of the invention will be described by reverting to FIG. 5. In the apparatus according to FIG. 5, the crystal 138, for example, may consist of ferroelectric material. The crystal 137, consisting of a photoelectret, is first provided with a space charge corresponding to the information to be entered. The laser beam issuing directly from the laser diode 136 traverses the photoelectret 137 where it is modified in accordance with the space charge contained in the photoelectret and consequently in accordance with the stored information. In this manner, the information is transferred onto the ferroelectrical crystal 138. Such a manner of storing information is particularly of advantage for data processing by utilizing the electrical hysteresis of the ferroelectric crystal. The hysteresis of ferroelectrics corresponds qualitatively to that of magnetic materials. Consequently, an embodiment of the type just described affords using the type of devices known, and applicable in a corresponding manner, for magnetic data processing.

The ferroelectric crystal 138 must be provided with an external electric circuit substantially in analogy to the circuitry of the photoelectret 7 in FIG. 1, in order to perform the individual steps of operation, namely storing, further processing, readout and clearing of the information. Such external circuitry is applied in a simple manner, for example by employing the same electrical circuit for the photoeleret 137 (FIG. 5) and simultaneously for the ferroelectric crystal 138.

The ferroelectric crystal structure may be subdivided into cells in the same manner as described with reference to the photoelectret in FIG. 3. For example, each individual cell of the photoelectret shown in FIG. 3 may correspond to a cell of a ferroelectric crystal designed in the same manner.

The embodiments described with reference to FIGS. 8 and 14 are presented by way of example only. It will be obvious to those skilled in the art that these embodiments are readily amenable to modification. For example, the photoelectret mounted on a rotatable disc, a belt or a drum according to FIGS. 8 to 10, may also be employed with an information entering arangement according to FIGS. 1, 5 or 6.

While the invention has been described by means of specific examples and in specific embodiments, I do not wish to be limited thereto, for obvious modifications will occur to those skilled in the art without departing from the spirit and scope of the invention.

I claim:
1. Apparatus for xerographic conversion of information available as a multi-component coherent electromagnetic radiation field generally in the optical spectral regions, comprising an optical system for issuing said radiation field, said system being composed of anisotropic crystalline component regions including double-refractory and laser-active regions, at least one retentive crystal structure forming part of said system so as to be responsive to said electromagnetic radiation, said retentive crystal structure being formed of material from the group consisting of ferroelectrics and photoelectrets and being optically in feedback connection with said laser-active components.

2. Apparatus as claimed in claim 1, wherein said retentive ferroelectric structure is formed of Rochelle salt.

3. Apparatus as claimed in claim 1, wherein said retentive ferroelectric structure is formed of alkali-niobium-trioxide from the group $LiNbO_3$, $KNbO_3$.

4. Apparatus as claimed in claim 1, wherein said retentive photoelectret structure is formed of substance from the group consisting of sulfur and sulfides.

5. Apparatus as claimed in claim 1, wherein said retentive crystal structure is situated in the optical beam path of said system and forms a memory for storing of information constituted by the multi-component coherent radiation field.

6. Apparatus as claimed in claim 1, wherein said retentive photoelectret crystal structure has electrodes attached to opposite sides of said structure, said electrodes being permeable to laser radiation from said laser-active regions.

7. Apparatus as claimed in claim 6, wherein said optical system has a plurality of ray paths of said multi-component coherent radiation field, and has a spatial region of coincidence of said respetcive paths, said retentive photoelectret crystal structure being situated in said spatial region.

8. Apparatus as claimed in claim 7, further comprising a substrate upon which said photoelectret structure with said permeable electrodes is mounted, said substrate consisting of material permeable to radiation of the frequencies to be employed.

9. Apparatus as claimed in claim 8, wherein said substrate is formed of vitreous material.

10. Apparatus as claimed in claim 1, wherein said photoelectret crystal structure is partitioned into a raster array of individual radiation receiving memory cells.

11. Apparatus as claimed in claim 10, comprising a raster-shaped foil attached to said photoelectret crystal structure for subdividing it into said cells.

12. Apparatus as claimed in claim 10, wherein said photoelectret crystal comprises a multiplicity of individual and mutually independent electret cells jointly forming said raster.

13. Apparatus as claimed in claim 1, wherein said retentive crystal structure is constituted by raster forming electret means for storing radiatively supplied information by retaining a corresponding space charge distribution, and electric readout means coactive with said electret means for response to said space charge distribution.

14. Apparatus as claimed in claim 13, wherein said readout means comprises a probe electrode having a given reference potential.

15. Apparatus as claimed in claim 13, wherein said electret means has electrodes permeable to the information entering radiation, and said electrodes also form part of said readout means.

16. Apparatus as claimed in claim 15, further comprising an electric readout circuit connected to said permeable electrodes and containing means for measuring the readout discharge current.

17. Apparatus as claimed in claim 16, further comprising a source of optical radiation communicable with said electret means for releasing said discharge currents.

18. Apparatus as claimed in claim 1, wherein said retentive crystal structure is a photoelectret layer bordering one of said laser-active regions thus being optically in feedback connection therewith.

19. Apparatus as claimed in claim 1, wherein said retentive crystal structure is displaceable relative to said radiation field for sequentially subjecting respectively different regions of said structure to said field.

20. Apparatus as claimed in claim 1, wherein said retentive crystal structure is a photoelectret, and a source of optical radiation is in illuminating relation to said electret for clearing of stored information.

21. Apparatus as claimed in claim 19, further comprising a disc rotatable about its axis, said retentive crystal structure being mounted on said disc to rotate together therewith for sequentially subjecting said different crystal regions to said field.

22. Apparatus as claimed in claim 19, further comprising a longitudinally movable carrier belt, said retentive crystal structure being mounted on said belt to travel together therewith for sequentially subjecting said different crystal regions to said field.

23. Apparatus as claimed in claim 19, further comprising a drum rotatable about its axis, said retentive crystal structure being mounted on the peripheral surface of said drum to rotate together therewith for sequentially subjecting said different crystal regions to said field.

24. Apparatus as claimed in claim 1, further comprising electric readout means coactive with said electret means for response to the space charge distribution retained in said electret means, said readout means having an electron ray deflectable by the dipole field of said electret means.

25. Apparatus as claimed in claim 1, wherein said retentive crystal structure comprises at least one photoelectret and at least one ferroelectric region of which each forms a memory for storing information constituted by said coherent electromagnetic radiation field.

26. Apparatus as claimed in claim 25, further comprising electric field means having a field of reversible direction and being adapted to be switched on and off under control by said photoelectret, said ferroelectric region being located in said photoelectret-controlled electric field.

27. Apparatus as claimed in claim 25, wherein said ferroelectric region is formed of a raster array of individual ferroelectric cells.

References Cited

UNITED STATES PATENTS

| | | | |
|---|---|---|---|
| 3,000,735 | 9/1961 | Gunning | 95—1.7 X |
| 3,007,049 | 10/1961 | McNaney | 250—49.5 |
| 3,306,160 | 2/1967 | Dinhobel | 95—1.7 |

TERRELL W. FEARS, Primary Examiner

U.S. Cl. X.R.

95—1; 250—217, 49.5; 340—173.2